Nov. 30, 1943.   C. THUMIM   2,335,709
HIGH-SPEED RECLOSING MECHANISM
Filed June 25, 1941   2 Sheets-Sheet 1
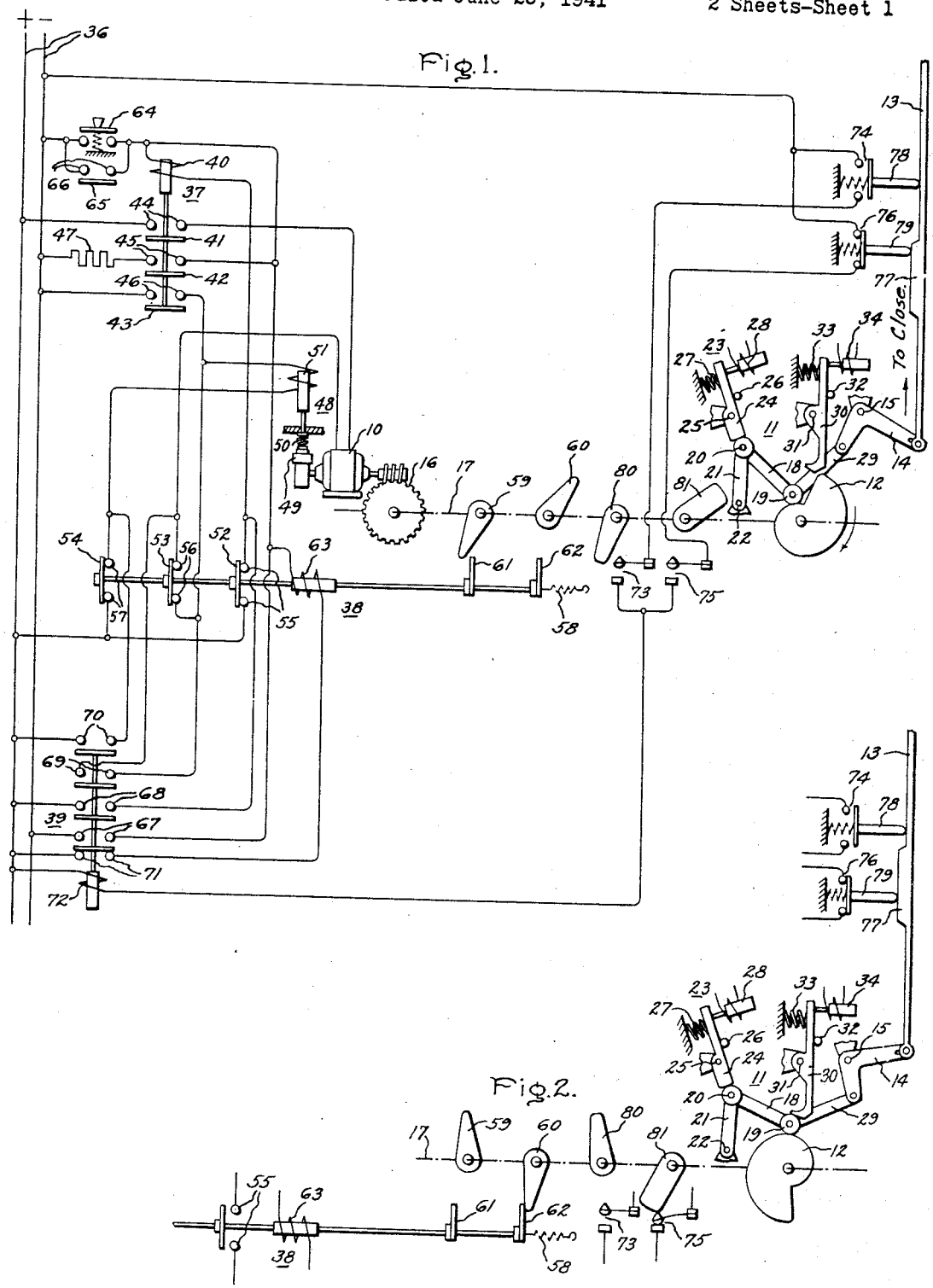
Inventor:
Carl Thumim,
by Harry E. Dunham
His Attorney.

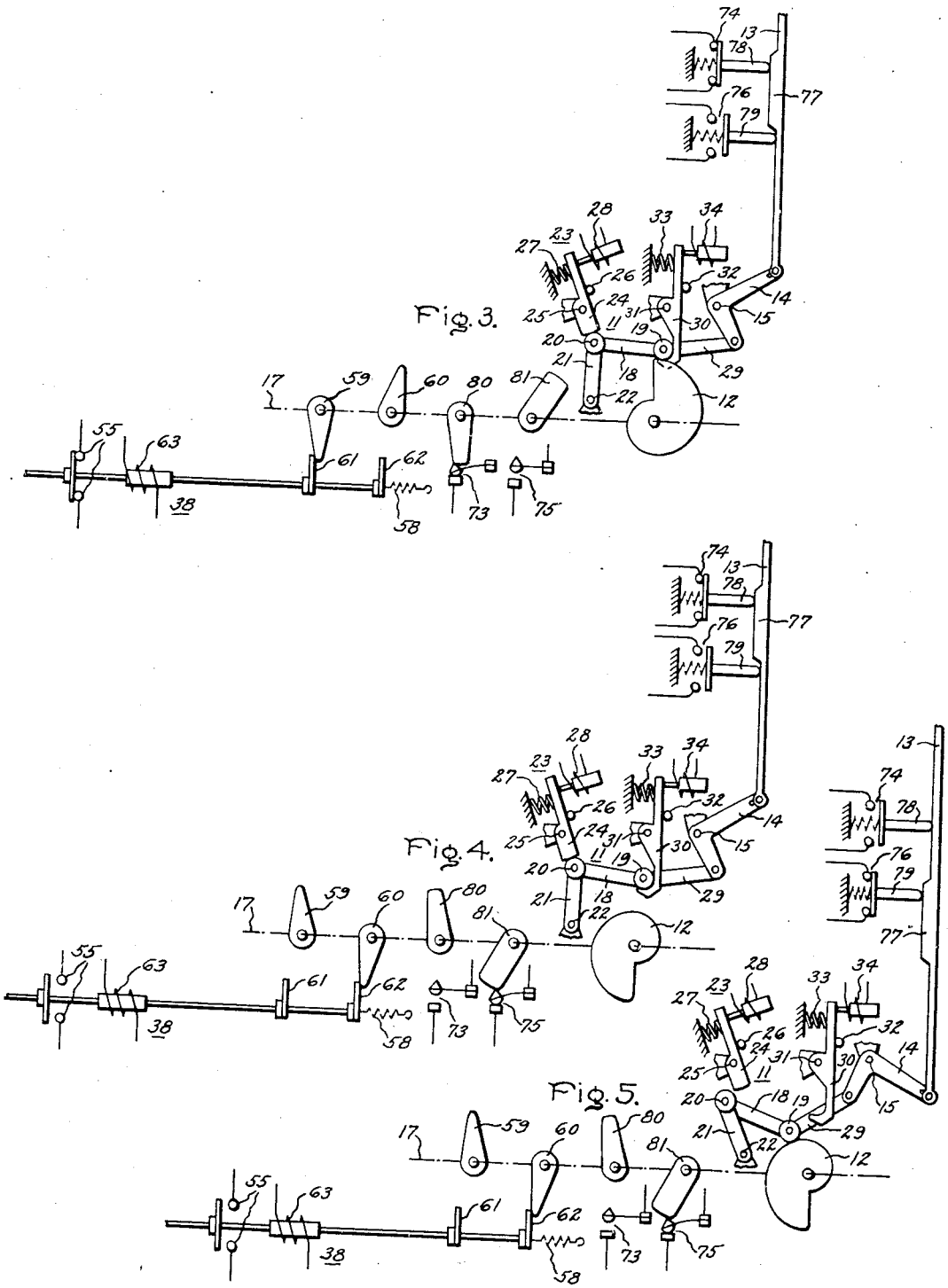

Patented Nov. 30, 1943

2,335,709

UNITED STATES PATENT OFFICE 2,335,709

HIGH-SPEED RECLOSING MECHANISM

Carl Thumim, Yeadon, Pa., assignor to General Electric Company, a corporation of New York Application June 25, 1941, Serial No. 399,623

6 Claims. (Cl. 175—294)

My invention relates to high-speed reclosing mechanisms and more particularly as applied to electric circuit breakers which are connected in high-voltage networks or power transmission lines. Specifically, this invention is an improvement on the arrangement disclosed and claimed in my prior Patent 2,296,300, granted September 22, 1942, and assigned to the same assignee as the present application.

In electric distribution systems where continuity of service is an important factor, means have been provided for quickly reclosing an electric circuit breaker one or more times after automatic opening in response to a fault on the assumption that a large percentage of faults, such as surges due to lightning, for example, are of a temporary nature. From the standpoint of continuity of service, the ideal condition is for the circuit breaker to be reclosed instantly after the breaker has cleared the fault. Where standard opening and closing mechanisms are employed prior to my copending application, reclosure could not actually start until the full opening stroke had been completed, that is, an appreciable time after the fault current had been interrupted.

Since a well designed circuit breaker can actually clear a fault within a few inches of opening stroke movement, it is unnecessary to require the full opening stroke of the circuit breaker which is usually quite large in view of the dual function of the circuit breaker, namely, to interrupt and isolate the circuit. Accordingly, it would be desirable in connection with motor-operated cam mechanisms which are operatively related to the circuit breaker for effecting closing and reclosing thereof to provide a preset or intermediate position for high-speed reclosing of said circuit breaker and accurately to position this cam in both this preset position and the normal reset position when the circuit breaker is not operated as a reclosing breaker without resorting to cam-centering means or the like.

It is an object of my invention, therefore, to provide a new and improved high-speed reclosing mechanism that is efficient, positive, and more rapid in operation than arrangements known heretofore and which is effective to apply a reclosing force instantly at a predetermined intermediate point in the opening stroke.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 thereof is a partly diagrammatic layout of a high-speed reclosing mechanism embodying the present invention with the mechanism in a particular operating position, and Figs. 2, 3, 4, and 5 are partial views of the mechanism of Fig. 1 in different positions to aid in understanding the operation of the high-speed reclosing mechanism.

The automatic reclosing mechanism illustrated in Fig. 1 consists essentially of a suitable source of motive power, such as motor 10, a trip-free thrust-transmitting linkage generally indicated at 11, and an operating cam 12 interrelating the source of motive power 10 and the trip-free thrust-transmitting linkage 11. The thrust-transmitting linkage 11 is operatively connected to the circuit breaker operating rod 13 by means of a crank 14 pivotally mounted at 15. The operating power is transmitted from the motor 10 through a gear train 16 to the cam shaft indicated at 17 upon which main operating cam 12 is mounted.

The main operating cam 12 is rotated clockwise by the motor 10 so as to rotate in a counterclockwise direction the floating link 18 provided with a cam follower 19 for engaging with main operating cam 12. The floating link 18 is pivotally connected at 20 to a supporting link 21 mounted for rotation at 22. Supporting link 21 is adapted to be latched and held stationary by means of a latching device generally indicated at 23. Latching device 23 comprises an electromagnetically operated latch 24 pivotally mounted at 25 and biased in a clockwise direction against stop 26 by spring means 27. Latch 24 is operated to release supporting link 21 by means of a solenoid 28 energized from a suitable control circuit, not shown.

It will be noted that the latching device 23 controls the pivot point 20 so that the breaker operating rod 13 which is connected to the floating link 18 by means of crank 14 and link 29 is free to move to the lower or open circuit position when the latch 24 is tripped by solenoid 28.

The floating link 18 is also maintained in the thrust-transmitting position holding the circuit breaker closed independently of the main operating cam 12 by means of a prop member 30 pivotally mounted at 31 and normally biased in a clockwise direction against stop member 32 by spring means 33. Pivoted prop member 30 is illustrated as provided with a hook-shaped end which is biased to engage the under side of cam follower or roller 19 for the purpose of holding the floating link 18 in the positions shown in Figs. 3 and 4 when the circuit breaker is in the closed position against the normal opening bias of the breaker, itself. The pivoted prop 30 is operated electromagnetically by means of solenoid 34 which is connected in a suitable control circuit, not shown. Energization of solenoid 34 causes prop 30 to rotate in a clockwise direction so as to release cam follower or roller 19 and permit it to assume the positions indicated by Figs. 1 or 2 depending upon the position of main operating cam 12 to permit opening of the circuit breaker, not shown.

When the circuit breaker is either in the fully opened position of Fig. 1 or the fault clearing position of Fig. 2, the cam follower 19 is lowered so as to be in engagement with the surface of main operating cam 12. Under these conditions, latching device 23 may be in the reset position indicated in Figs. 1 to 4, and, when the motor 10 is energized to rotate the main operating cam 12, cam follower 19 is elevated, thereby causing counterclockwise rotation of crank 14 and closing of the circuit breaker connected to operating rod 13. When the breaker reaches the closed position indicated by Fig. 3, the pivoted prop 30 moves under the influence of spring means 33 so that the hooked-shaped portion thereof engages the under side of cam follower 19 so as to hold the thrust-transmitting linkage 11 in the position indicated in Figs. 3 and 4 until a tripping operation is initiated. As indicated in Fig. 1, the circuit breaker is in the open position and the cam is in the reset position from which closing of the circuit breaker is initiated upon full opening thereof.

In order to control the closing and reclosing of the circuit breaker through operating rod 13, I have provided a source of control potential 36, a closing contactor generally indicated at 37, a multiple contact cutoff switch generally indicated at 38 and adapted to be operated mechanically and held open electrically, and a bridging contactor generally indicated at 39. Closing contactor 37 is operated by means of a solenoid 40 which controls a plurality of contact-controlling members 41, 42, and 43 adapted to bridge contacts 44, 45, and 46, respectively. Contacts 44 and 46 are connected in the circuit of motor 10 and control the application of potential from source 36 to motor 10 for operation thereof. Contacts 45 on the other hand are seal-in contacts for solenoid 40 and a suitable resistor 47 is provided in series with the seal-in contacts to limit the current which flows through the winding of solenoid 40 since, as will be understood by those skilled in the art, less current is required to hold contactor 37 in the closed position than to produce the closing movement thereof.

In order to stop main operating cam 12 accurately at a definite position without resorting to centering means such as return springs which cause the cam after having overtravelled to return to a predetermined position, I have provided braking means applied to the low-torque high-speed end of the mechanism accurately to position main operating cam 12. This braking means is preferably that disclosed and claimed in copending application Serial No. 344,530, filed July 9, 1940, and assigned to the same assignee as the present application. For the sake of simplicity in the drawings, this braking means is generally indicated at 48 in Fig. 1 and is illustrated schematically as comprising a brake shoe 49 normally biased by spring means 50 to stop motor 10. A suitable electromagnet 51 is provided for releasing braking means 48 when energized. Since this braking means applies its force to motor 10 which operates at low torque and high speed, the stopping of this motor within a revolution or two will provide very accurate positioning of main operating cam 12. Brake electromagnet 51 is energized from source 36 through contacts 46 controlled by closing contactor 37.

The energization circuit of motor 10, brake electromagnet 51, and solenoid 40 is further controlled by multiple contact cutoff switch 38 referred to above. This cutoff switch comprises a plurality of contact-controlling members 52, 53, and 54 for bridging contacts 55, 56, and 57, respectively. Contacts 55 are connected in series with solenoid 40, contacts 56 are connected in series with motor 10 and contacts 57 are connected in series with brake solenoid 51. Normally multiple contact cutoff switch 38 is biased so as to close contacts 55, 56, and 57 by virtue of spring means 58. However, these contacts are adapted to be mechanically opened under predetermined conditions by virtue of auxiliary cams 59 and 60 mounted on cam shaft 17, the operation of which will be described in greater detail hereinafter. As schematically illustrated in Fig. 1, rotation of cam 59 will cause it to engage extension 61 of multiple contact cutoff switch 38 to move it against the bias of spring 58 for opening the contacts 55, 56, and 57. Similarly, cam 60 during clockwise rotation thereof will engage extension 62 of multiple contact cutoff switch 38 to open contacts 55, 56, and 57 against the bias of spring means 58. Multiple contact cutoff switch 38 is also provided with a holding coil 63 which, when energized, is capable of maintaining contacts 55, 56, and 57 in the open position when operated to that position mechanically by virtue of cams 59 or 60.

The closing operation of the motor-operated cam mechanism associated with the circuit breaker, not shown, is controlled manually by means of push button 64 which completes the energization circuit of closing contactor solenoid 40 from source 36. Automatic reclosing operation of the circuit breaker may be obtained through the operation of a reclosing relay which is not shown except for contact-controlling member 65 thereof adapted to bridge contacts 66 connected in parallel with push button 64. This reclosing relay may be any automatic type well understood by those skilled in the art which is adapted to move contact-controlling member 65 to the closed position when the reclosing operation of the circuit breaker is desired. The construction of this relay forms no part of the present invention and may be similar to that disclosed in my prior copending application referred to above.

The closing and reclosing control circuit for motor-operated cam mechanism described above also includes bridging contactor 39 which is adapted to control a plurality of normally open contacts 67, 68, 69, and 70 and a normally closed contact 71. When the winding 72 of bridging contactor 39 is energized, normally closed contact 68 completes a circuit in parallel with the circuit controlled by contacts 55 of multiple contact cutoff switch 38. Similarly, contacts 69 parallel contacts 56 connected in the circuit of motor 10 and contacts 70 parallel contacts 57 connected in the circuit of brake solenoid 51. Contacts 67, on the other hand, parallel push button 64 or contact-controlling member 65 to energize closing contactor solenoid 40, motor 10, and brake solenoid 51. Normally closed contacts 71 are connected in series with holding coil 63 which is energized when push button 64 or member 65 is closed. Energization of winding 72 of bridging contactor 39, however, opens contacts 71 to deenergize holding coil 63.

The winding 72 of bridging contactor 39 is energized from source 36 through either one of two parallel paths, one of which includes cam-controlled switch 73 and a switch 74 while the other path comprises cam-controlled switch 75 and b switch 76. a switch 74 is the conventional switch operated in response to the movement of the circuit breaker and is open when the circuit breaker is open and is closed at the end of the closing stroke when the circuit breaker is closed. This may be accomplished in various ways and, in Fig. 1, I have illustrated a cam 77 attached to breaker operating rod 13 for engaging an extension 78 of a switch 74 to close the latter upon completion of the closing stroke of the circuit breaker. b switch 76, on the other hand, is also operated by cam 77 which engages an extension 79 thereof. This switch is so constructed and arranged as to be closed during approximately the first 80 per cent of the closing stroke of the circuit breaker but open for the last 20 per cent of the closing stroke and in the closed position of the circuit breaker. Cam-operated switch 73 is controlled by an auxiliary cam 80 mounted on cam shaft 17 in such a manner with respect to auxiliary cam 59 as to close switch 73 slightly before cam 59 opens multiple contact cutoff switch 38 and allows cam-operated switch 73 to open shortly after cam 59 permits cutoff switch 38 to close. In order to operate cam-operated switch 75, I have provided another auxiliary cam 81 similar to cam 80 which bears substantially the same relation to auxiliary cam 60 as cam 80 bears to auxiliary cam 59. In other words, cam 81 mounted on cam shaft 17 and rotated in a clockwise direction in response to rotation of motor 10 causes switch 75 to be closed slightly before cam 60 moves cutoff switch 38 to the open position. Furthermore, cam 81 permits switch 75 to open after cam 60 permits cutoff switch 38 to open. Cam 81 differs from cam 80 only in that the cam surface thereof is somewhat greater so as to hold cam-operated switch 75 in the closed position for a longer period of time than cam 80 holds cam-operated switch 73 in the closed position.

The control circuit for opening the circuit breaker associated with the cam-controlled mechanism of Fig. 1 both manually and automatically has not been shown since it forms no part of the present invention. However, this control is preferably the control disclosed in my prior copending application referred to above.

The operation of the high-speed reclosing mechanism disclosed in Figs. 1 to 5 will now be described with reference to the various figures which show successive positions assumed by the apparatus during operation thereof. Fig. 1 illustrates the circuit breaker in the open position with the main operating cam 12 in the reset position with the breaker in the full open isolating position. Fig. 2 shows the circuit breaker during the closing stroke with the main operating cam having passed the preset position. Fig. 3 illustrates the breaker near the end of the closing stroke with the main operating cam 12 about to pass a closed position. The a switch 74 has been closed and the b switch 76 has been opened. Fig. 4 illustrates the circuit breaker in the closed position with the main operating cam in the preset position to permit high-speed reclosing in the event of tripping of the circuit breaker. Fig. 5 illustrates the opening of the circuit breaker by operation of the trip-free latch 23 with the main operating cam 12 about to leave the preset position for high-speed reclosing of the circuit breaker.

With the breaker in the open position as indicated in Fig. 1 and the main operating cam 12 in the reset position indicated, closing of the circuit breaker may be obtained by depressing push button 64 or by the closing of contacts 66 by bridging member 65 through operation of the closing or reclosing relay, not shown. In either event, closing contactor solenoid 40 is energized from source 36 through normally closed contacts 55 of cutoff switch 38, whereupon closing of contacts 44, 45, and 46 occurs. The closing of contacts 45 seals in solenoid 40 so that push button 64 or contact 66 may be opened without interfering with the continuance of the closing operation until contacts 55 are opened through operation of cutoff switch 38. Motor 10 and brake solenoid 51 are energized upon closing of closing contactor 37 through cutoff contacts 56 and 57, respectively, so that the brake 48 is released and motor 10 begins to rotate main operating cam 12 and auxiliary cams 59, 60, 80, and 81. Since latch 23 holds pivots 20 in the fixed position, the closing stroke of the circuit breaker progresses with the rotation of main operating cam 12. As the closing stroke progresses to the position indicated in Fig. 2, auxiliary cam 81 closes switch 75 while the b switch 76 is still closed, whereupon the winding 72 of bridging contactor 39 is energized so as to close contacts 67, 68, 69, and 70 and to open contacts 71. Immediately, thereafter, as indicated by Fig. 2, cam 60 opens multiple contact cutoff switch 38 mechanically but the energization of motor 10 is not interferred with because the contacts 55, 56, and 57 of cutoff switch 38 are bridged by the contacts 68, 69, and 70 of bridging contactor 39. Since contacts 71 are opened by the operation of bridging contactor 39, holding coil 63 cannot be energized so that further rotation of cam shaft 17 permits reclosing of cutoff switch 38, and opening of switch 75 shortly thereafter so that the preset position of main operating cam 12 is passed without disturbance.

At the end of the closing stroke indicated best by Fig. 3, the continued rotation of cam shaft 17 causes cam-operated switch 73 to be closed and, since the a switch is now closed, bridging contactor 39 is again energized so as to close its contacts 67, 68, 69, and 70 as before and open contacts 71. Immediately thereafter, auxiliary cam 59 opens multiple contact cutoff switch 38 but, by virtue of contacts of bridging contactor 38, motor 10 continues to operate passing the reset position illustrated in Fig. 1 without disturbance. When the preset position of main operating cam 12 is again reached as shown in Fig. 4, cam 81 has again closed switch 75 but bridging contactor 39 can no longer be energized through this circuit since the b switch 76 is not open. Consequently, when auxiliary cam 60 moves multiple contact cutoff switch 38 to the open position as indicated in Fig. 4, the circuit of motor 10 brakes solenoid 51 and closing contactor solenoid 40 is opened. Spring means 50 quickly applies brake 48 to motor 10 so that accurate positioning of main operating cam 12 occurs without having to wait for the overtravel and return necessary in prior arrangements utilizing centering springs or the like. Furthermore, as indicated in Fig. 4, the main operating cam 12 is stopped in the preset position intermediate the full open or full closed position with respect to the circuit breaker so that high-speed reclosing may be obtained.

If the circuit breaker is in the position indicated by Fig. 4, with the main operating cam 12 in the preset position, an automatic tripping operation, such as by energization of solenoid 34, will initiate reclosing through operation of reclosing relay only contacts 65 of which are illustrated. The reclosing cycle is thereby intiated and operation similar to that described above results except that main operating cam 12 starting from the preset position has a shorter distance to travel for completing the closing operation since it meets the breaker in only a partly open position, thereby permitting higher speed reclosing.

If the circuit breaker is tripped manually for an opening operation from the preset position of cam 12 indicated by Fig. 4 with switch 75 in the closed position, energization of bridging contactor 39 will result since the b switch is closed during the opening stroke as indicated by Fig. 5. The closing of contacts 67 and 68 of bridging contactor 69 causes energization of closing contactor solenoid 40, whereupon motor 10 and brake solenoid 51 are also energized to initiate the closing operation from the position indicated in Fig. 5 even though cutoff switch 38 is open. When auxiliary cam 80 closes switch 73, bridging contactor 39 is not energized since, with latch 23 in the position indicated in Fig. 5, resetting thereof cannot occur until cam follower 19 reaches the low position of main operating cam 12. Consequently, the circuit breaker does not close even though main operating cam 12 rotates and, since a switch 74 does not close, bridging contactor 39 cannot be energized. When, immediately subsequent thereto, auxiliary cam 59 opens cutoff switch 38, the motor 10 and brake solenoid 51 are deenergized and main operating cam 12 is accurately positioned in the reset position of Fig. 1, whereupon resetting of latch 23 results so that the linkage is ready for subsequent closing of the circuit breaker.

A trip-free operation during the closing stroke of the circuit breaker will occur when cam 80 closes switch 73. However, since a switch 74 opens, bridging contactor 39 cannot be energized so that, as soon as cam 59 opens cut-off switch 38, deenergization of motor 10 and accurate stopping of main operating cam 12 in the reset position will result.

While I have shown a particular embodiment of my invention, it will be understood that my invention is not limited to the particular construction shown but that changes and modifications may be made without departing from the spirit and scope of my invention and I, therefore, aim in the appended claims to cover all such changes and modifications.

What I claim as new and desire to secure by Letters Patent of the United States is:

1. An automatic reclosing circuit breaker system comprising circuit-breaker operating means, a cam adapted to close the circuit breaker through said means, means for driving said cam comprising a motor, brake means associated with said motor, means for effecting the application and release of said brake means simultaneously with the deenergization and energization of said motor, means for presetting said cam at an intermediate point in the full operating stroke thereof, and means for energizing said motor and releasing said brake in response to tripping of said circuit breaker so that said circuit breaker is immediately reclosed by said cam after but a fractional part of the full opening stroke of said circuit breaker.

2. An automatic high-speed reclosing circuit breaker system comprising circuit-breaker operating means including a trip-free linkage, a cam related to said linkage for effecting a full-stroke closing operation from substantially the low point of said cam in its initial reset position, means for driving said cam comprising a motor, a brake associated with said motor and arranged to be applied upon deenergization of said motor for accurately stopping said cam in predetermined positions, means for controlling said motor and brake to stop said cam at an intermediate preset position after initial closure of said breaker, releasing means related to said linkage, means for simultaneously energizing said motor and releasing said brake in accordance with tripping of said linkage by said releasing means whereby said circuit breaker is checked at an intermediate point in its opening stroke and is immediately reclosed from said intermediate preset cam position, and means for controlling said brake and motor to stop said cam in said initial reset position upon tripping of said circuit breaker after reclosure thereof.

3. An automatic reclosing circuit-breaker system comprising circuit-breaker operating means, a cam adapted to close the circuit breaker through said means, means for driving said cam comprising a motor, brake means associated with said motor and normally biased to stop said motor, electrical means for releasing said brake simultaneously with the energization of said motor, means for presetting said cam at an intermediate point in the full operating stroke thereof, and means for energizing said motor and releasing said brake in response to tripping of said circuit breaker so that said circuit breaker is immediately reclosed by said cam after but a fractional part of the full opening stroke of said circuit breaker.

4. An automatic reclosing circuit-breaker system comprising circuit-breaker operating means, a main cam adapted to close the circuit breaker through said means, means for driving said main cam comprising a motor, brake means associated with said motor, means for effecting the application and release of said brake means simultaneously with the deenergization and energization of said motor, a control circuit including a plurality of cams driven by said motor for causing presetting of said main cam at an intermediate point in the full opening stroke thereof, and means for energizing said motor and releasing said brake in response to tripping of said circuit breaker so that said circuit breaker is immediately reclosed by said main cam after but a fractional part of the full opening stroke of said circuit breaker.

5. In an operating mechanism for an electric circuit breaker, a rotatable cam, means for driving said cam comprising a motor, means adapted to be actuated from one position to another position by said cam for closing said circuit breaker, a brake for said motor and spring means for normally holding said brake in braking position, a solenoid for releasing said brake, means for energizing said motor and said solenoid simultaneously for initiating the closing operation of said circuit breaker, and electrical control means for maintaining said motor and solenoid in an energized condition upon complete closure of said electric circuit breaker causing said cam to assume a preset position at an intermediate point in its operating stroke to permit high-speed reclosing of said circuit breaker to be initiated after but a fractional part of a full opening stroke of said circuit breaker.

6. In an operating mechanism for an electric circuit breaker, a rotatable cam, means for driving said cam comprising a motor, means adapted to be actuated from one position to another position by said cam for closing said circuit breaker, a brake for said motor and spring means for normally holding said brake in braking position, a solenoid for releasing said brake, means for energizing said motor and said solenoid simultaneously for initiating the closing operation of said circuit breaker, electrical control means for maintaining said motor and solenoid in an energized condition upon complete closure of said electric circuit breaker, means for causing said cam to assume a preset position at an intermediate point in its operating stroke to permit high-speed reclosing of said circuit breaker to be initiated after but a fractional part of a full opening stroke of said circuit breaker, and means including said electrical control means for deenergizing said motor and solenoid to stop said cam in a different predetermined position from said preset position after a trip-free operation during the closing stroke of said circuit breaker.

CARL THUMIM.